Aug. 10, 1943.　　　P. J. KIRCHER　　　2,326,365
BATHROOM WEIGHING SCALE
Filed Jan. 15, 1942　　　3 Sheets-Sheet 1
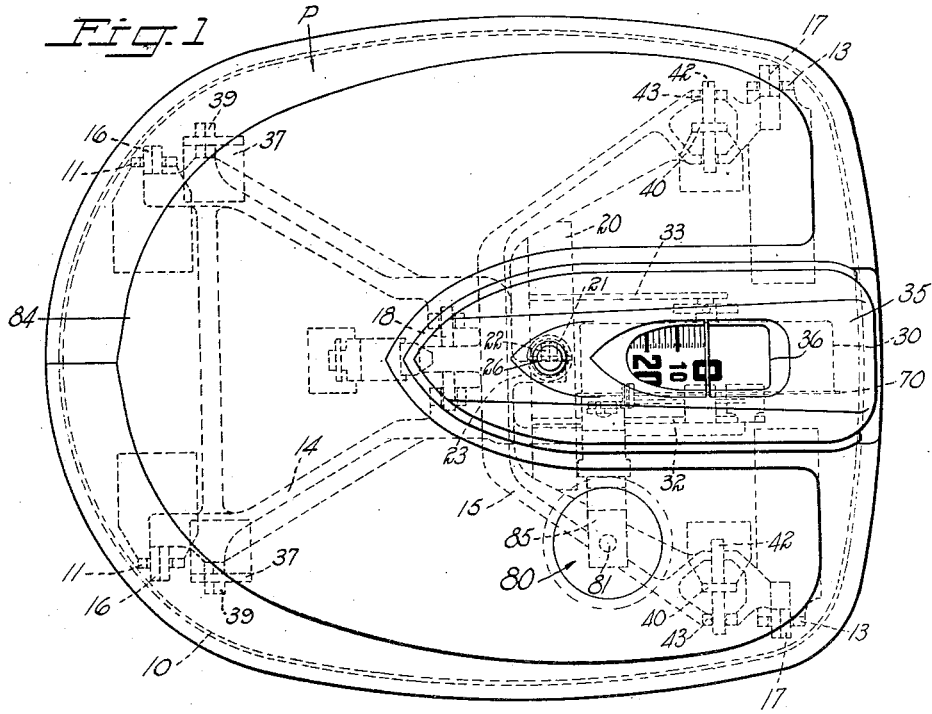
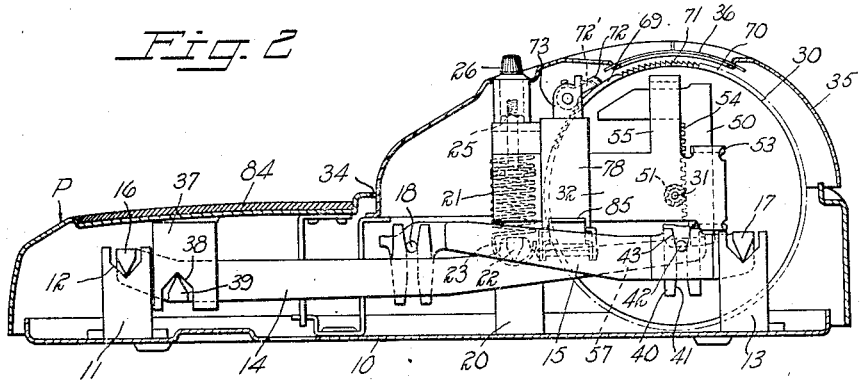
Inventor
PAUL J. KIRCHER
By Lindsay and Robillard
Attorneys

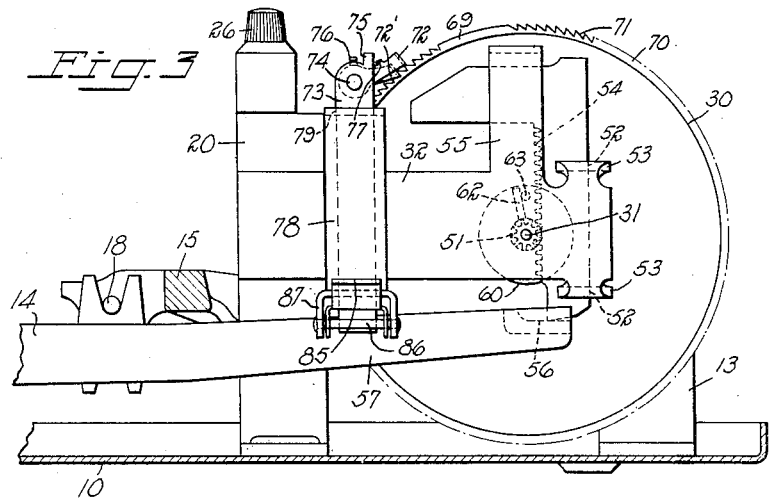

Aug. 10, 1943.   P. J. KIRCHER   2,326,365
BATHROOM WEIGHING SCALE
Filed Jan. 15, 1942   3 Sheets-Sheet 3

Inventor
PAUL J. KIRCHER

By Lindsey and Robillard
Attorneys

Patented Aug. 10, 1943

2,326,365

UNITED STATES PATENT OFFICE 2,326,365

BATHROOM WEIGHING SCALE

Paul J. Kircher, Plainville, Conn., assignor to Landers, Frary & Clark, New Britain, Conn., a corporation of Connecticut Application January 15, 1942, Serial No. 426,798

8 Claims. (Cl. 265—63)

This invention relates to weighing scales of the portable type, such as used in households for determining the weight of persons. Scales of this type, known as bathroom scales, are relatively low or shallow and the indicating or registering element, such as the drum, is ordinarily adjacent the plane of the platform on which the person stands while weighing himself.

With scales of this type, it has been necessary for the person weighing himself, in order to read his weight as indicated by the registering means, to lean over and look down on the registering means while standing on the platform. It is awkward to do this, and somewhat dangerous as he may lose his balance since the platform is relatively small and the registering means is located near the floor. Considerable difficulty is experienced, particularly if the person weighing himself has poor eyesight or if the indicating means is not in the proper light, in reading the weight as registered by the indicating means.

An aim of the present invention is to provide a scale of this sort with an improved, effective, and reliable arrangement which will permit the person desiring to weigh himself to step upon the platform of the scale and, after the platform has come to rest in a position where the weight thereon is properly registered on the indicating means, to very simply and quickly lock that indicating means in its registering position and then step off of the platform and, from a position on the floor, conveniently and without awkwardness or difficulty, read his weight as indicated by the locked indicator means. As the person can read the scale from the position on the floor, there is no danger that he may lose his balance as would be the case if he tried to read the scale while standing on the relatively small platform.

A further aim of the invention is to provide an improved arrangement for unlocking the indicating means when a person steps upon the scale and for locking the same before he steps off of the scale preparatory to reading the same, the control for such locking means being on the platform where it can be very easily and quickly manipulated by the foot of the person weighing himself.

A still further aim of the invention is to provide an improved arrangement of this sort which is characterized by its economy and simplicity in construction and arrangement.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings, wherein is shown one embodiment which the present invention may take:

Figure 1 is a top plan view of a scale in which my improvements are incorporated;

Fig. 2 is a side view thereof with the base and platform in longitudinal central cross section;

Fig. 3 is a detail view showing the indicating drum and the locking means in right-hand side elevation;

Fig. 4 is a rear view of the scale with parts omitted and parts in section generally on a vertical plane passing through the indicating drum;

Figure 5:
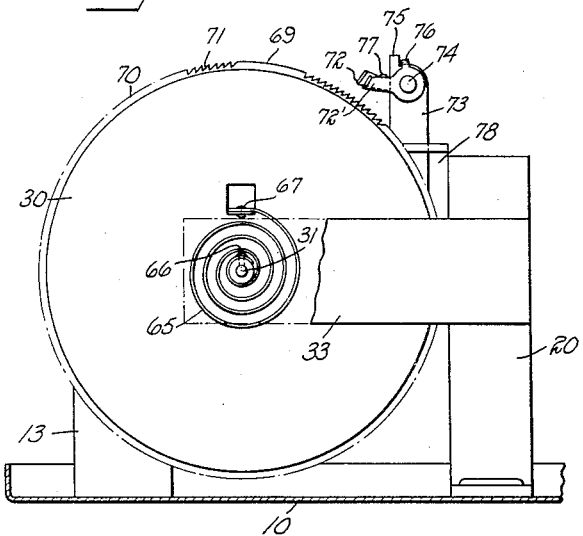
Fig. 5 is a detail view looking at the left-hand side of the indicating drum.

Referring to the drawings in detail, the scale is shown as having a shallow, generally rectangular base 10 adapted to rest upon the floor. Adjacent the forward end of the base is a pair of aligned fulcrum brackets 11 having V-shaped seats 12 in their upper ends. Adjacent the rear end of the base is a pair of similar fulcrum brackets 13. The load responsive means includes a system of levers which comprises the two opposed levers 14 and 15, the forward one 14 of which has fulcrums 16 pivoted in the seats 12 of the bracket 11. The other or rear lever 15 has knife edges 17 fulcrumed in seats in the upper ends of the brackets 13. The adjacent ends of the levers are pivotally connected together by a pin 18.

Secured to the base centrally of the sides thereof is an inverted U-shaped bracket 20 and between the top cross portion of this bracket and the system of levers is the usual counterbalancing spring 21. In the present instance, the lower end of the spring is looped over a stud 22 projecting from a lug 23 which extends rearwardly and centrally from the forward lever 14. The upper end of the spring 21 is connected to a screw threaded rod which passes upwardly through an opening in the cross portion of the bracket 20 and receives a nut 25. This nut may be adjusted on the rod as by means of a knob 26.

The indicating device is in the form of a light, hollow drum 30 having upon its periphery indicia designating units of weight, such as pounds. This drum is located centrally between the sides of the base and rearwardly of the bracket 20. It is journaled, as described hereinafter in detail, on a transverse pinion shaft 31, the opposite ends of which are rotatably mounted in arms or plates 32 and 33 secured to the vertical legs of the bracket 20 and extending rearwardly therefrom in parallelism with one another. The numeral 35 designates a relatively narrow casing secured to the base and housing the upper portions of the indicating drum and the frame which supports the same and which frame includes the bracket 20 and the arms 32 and 33. This casing has a sight opening or window 36 located immediately above the drum so that readings may be readily taken from the latter.

The platform on which the person stands when he wishes to weigh himself is designated by the letter P. This platform is in the form of an inverted shell and conforms generally in configuration to the base so as to cover the same. The rear end of the platform P is centrally and longitudinally slotted or recessed as at 34 so as to accommodate the stationary casing 35. The platform has, adjacent its forward end, two aligned depending legs 37 provided with V notches 38 in their lower ends which receive knife edges 39 carried by the arms of the lever 14 rearwardly of the pivot 16 of that lever. The platform has, adjacent its rear end, two transversely aligned legs 40 having notches 41 in their lower ends which receive the pivot pins 42 mounted in the seats 43 provided in the arms of the rear lever 15 just forwardly of the line of pivot of that lever.

The drum is operated from the system of levers through a rack member 50 and a pinion 51, the latter being formed on the shaft 31. The rack member is in the form of an L-shaped plate disposed in a vertical plane. The vertical leg of this plate is slidably mounted in notches 52 provided in ears 53 extending laterally from the side plate 32. The forward edge of the vertical leg of the rack member has rack teeth 54 meshing with the teeth of the pinion 51. The side plate 32 has an upwardly extending finger 55, the upper end of which is turned laterally over the horizontal leg of the rack member so as to limit the extent to which the rack member can be raised. The lower end of the vertical leg of the rack member rests on a seat 56 provided on the upper face of the rear end of an arm 57 which extends rearwardly from the front lever 14.

Figure 6:
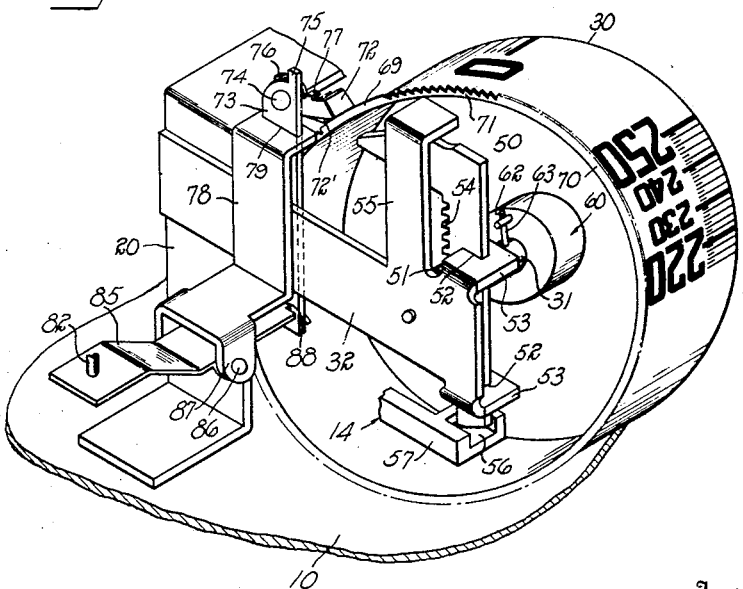
Fig. 6 is a perspective view of the indicating drum and associated parts.

The drum 30 has a two-part hub 60 which rotatably receives the reduced portion 61 of the shaft 31. Between the shaft and the drum is a lost motion connection through which the drum is picked up by the shaft when the latter is turned clockwise (reference being had to Figs. 2, 3, and 6) by the rack member 50 when a person steps upon the platform, and this lost motion connection permits the drum to be held stationary and the shaft 31 to be turned in the opposite direction, i. e., counterclockwise, when the person steps off of the platform and the system of levers assumes its normal position. In the present instance, this lost motion connection comprises a pin 62 extending radially from the shaft 31 and a pin 63 extending laterally from the hub 60 and into the path of movement of the pin 62. The drum is resiliently spring connected to the shaft in order that the pins 62 and 63 will be maintained in substantial engagement when the drum is unlocked and to cause the drum to assume its zero position after the drum has been unlocked. In the present instance, this resilient connection comprises a coiled spring 65, the inner end of which is fixed as at 66 to the shaft, and the outer end of which is connected, as at 67, to the drum.

Reference will now be had to the means for locking the drum in its indicating position. The open end of the drum has a radially extending flange or rim 70 provided, for the greatest part of its length, with ratchet teeth 71 which face in the direction in which the drum is turned when brought back from an indicating to zero position. The portion 69 of the rim is smooth or uninterrupted. Cooperating with these ratchet teeth are two pawls 72 and 72' carried by a vertically movable pawl carrier 73 which, in the present instance, is in the form of a vertical strip of metal. While, in the present instance, two pawls are shown, the number may be varied. These pawls, which may be gravity operated, are pivoted on a pin 74 carried by the upper end of the member 73. In order to limit the extent of downwardly swinging movement of the pawls and thus prevent the pawls from engaging the ratchet teeth of the drum when the member 73 is in the raised position shown in Fig. 5, the carrier 73 has a stop 75 which cooperates with an ear 76 on the pawl 72', and the other pawl 72 has an ear 77 adapted to engage the upper edge of the pawl 72'. The carrier 73 is guided in its vertical movements by a bracket 78 welded or otherwise secured to the arm 32 of the supporting frame. In the present instance, this bracket 78 is in the form of a strip of metal having an upper laterally turned end provided with a slot 79 in which the pawl carrier 73 is slidably mounted.

The pawl carrier 73 is raised and lowered in order to unlock and lock the drum by a control member carried by the platform alongside of the casing 35 where it may be easily manipulated by the ball of the foot of the person desiring to weigh himself. In the present instance, this control member is in the form of a push button 80 having a crowned resilient head 81 (see Fig. 4) to which is centrally connected a depending pin or plunger 82 extending through an aperture 83 in the platform. The platform is covered with a flexible mat 84 of rubber, composition, or the like. The push button is operatively connected to the pawl carrier 73 by a lever 85 which is pivoted between its ends on a pin 86 mounted in ears 87 provided on the bracket 78. One end of the lever is disposed beneath the pin 83 of the push button and the other end of the lever extends through a horizontal slot 88 provided in the pawl carrier 73 adjacent the lower end thereof.

The operation of the mechanism is briefly as follows: Normally, when no one is standing on the platform, the parts are in the condition shown in Figs. 2 and 6 and in which condition the pawl carrier 73 is in its lowermost position and the pawls engage the smooth portion 69 of the ratcheted ridge 70 of the drum. A person wishing to weigh himself steps upon the platform and, with the ball of his right foot, presses upon the push button 80 so as to raise the pawl carrier from the position shown in Fig. 6 to that shown in Fig. 5. The platform and system of levers will move downwardly with the result that the rack member 50, by gravity, will follow the arm 57 of the forward lever downwardly and cause the shaft 31 to rotate clockwise. When the rack member thus moves downwardly, it causes the shaft 31 to rotate clockwise with the result that the pin 62 of that shaft will pick up the pin 63 of the drum and cause the drum to rotate to indicating position. After the scale has reached a state of equilibrium, the person weighing himself raises the ball of his foot from the push button or control member 80 with the result that the pawl carrier will move downwardly to the position shown in Fig. 3 where the pawls 72 will lock the drum in its indicating position. The person may now step off of the scale and when he does this, the platform and system of levers will rise to their normal positions and the rack member 50 will turn the shaft 31 counterclockwise without, however, turning the drum because the drum is resiliently connected to the shaft by the spring 65. The person, having stepped off of the scale, can now very conveniently, and without any danger of losing his balance, read the drum through the window 36. When the next person wishes to weigh himself, he steps upon the platform and exerts pressure by the ball of his foot against the control member 80 so as to unlock the drum and then the weighing proceeds in the manner above described.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a scale of the character described, a relatively low platform on which a person stands when weighing himself, a weight indicating member adjacent said platform, load responsive means operatively connected to said weight indicating member and responsive to movements of said platform, means for locking said weight indicating member in weight registering position, and a control member for said locking means carried by said platform within the area on which the person weighing himself stands whereby the control member may be conveniently operated by the foot of the person weighing himself.

2. In a scale of the character described, a relatively low platform on which a person stands when weighing himself, a weight indicating member rotatably mounted adjacent said platform, load responsive means operatively connected to said weight indicating member and responsive to movements of said platform, means for locking said indicating member in weight indicating position, and a control member for said locking means comprising a push button carried by said platform within the area on which the person weighing himself stands.

3. In a scale of the character described, a base, a system of levers thereon, an indicating member supported by the base at the rear end and centrally between the sides thereof, an operative connection between said indicating member and system of levers, a casing supported by said base and housing said indicating member, a relatively low platform supported by said levers and, at its rear end, straddling said casing, means within said casing for locking said indicating member in its weight indicating position, and a control member operatively connected to said locking means and located on said platform alongside of said casing whereby said control member may be conveniently operated by the ball of the foot of the person standing upon the platform.

4. In a scale of the character described, a base, a system of levers carried thereby, a transverse shaft supported on the base, a weight indicating drum supported by said shaft, an operative connection between said system of levers and said shaft, means slidably carried by the base for locking said drum in its weight indicating position, a relatively low platform carried by said system of levers and on which a person stands when weighing himself, and a control member for said locking means carried by said platform within the area upon which the person weighing himself stands.

5. In a scale of the character described, a base, a relatively low platform, load responsive means mounted on said base and responsive to movements of said platform, a shaft carried by said base adjacent the plane of said platform, a drum supported by said shaft and having a series of ratchet teeth on its periphery, an operative connection between said load responsive means and said shaft, a pawl carrier slidably mounted for vertical movement by said base, a pawl pivoted on said carrier and adapted to cooperate with said ratchet teeth to lock said drum in its weight indicating position, and control means for said pawl carrier to raise the same and thereby move said pawl out of engagement with said ratchet teeth.

6. In a scale of the character described, a base, a system of levers carried thereby, a relatively low platform carried by said system of levers and on which a person weighing himself stands, a transverse pinion shaft rotatably mounted in said base, a rack member between said pinion shaft and system of levers, a weight indicating drum journaled on said shaft and adapted to be turned thereby when weight is placed upon the platform, a spring connecting said drum to said shaft, said drum having a series of ratchet teeth on its periphery, a pawl adapted to cooperate with said ratchet teeth to lock said drum in weight indicating position, and control means carried by said platform for moving said pawl into and out of locking position with respect to said drum.

7. In a scale of the character described, a relatively low platform on which a person weighing himself stands, load responsive means responsive to movements of said platform, a transverse shaft adjacent the plane of said platform, an operative connection between said load responsive means and said shaft whereby the latter is turned when weight is placed upon the platform, a lost motion connection between said shaft and drum and through which said drum is turned in a weight indicating direction, a spring between said shaft and drum tending to maintain said lost motion connection in engagement, said drum having a series of ratchet teeth on its periphery, a pawl carrier mounted for vertical movement, a pawl pivoted on said pawl carrier and cooperating with said series of ratchet teeth for locking said drum in weight indicating position, and means for raising and lowering said pawl carrier.

8. In a scale of the character described, a base, a system of levers carried thereby, a relatively low platform carried by said system of levers and on which a person weighing himself stands, a transverse shaft carried by said base adjacent the plane of said platform, a weight indicating drum on said shaft having a series of ratchet teeth, an operative connection between said system of levers and said shaft whereby the latter is turned when weight is placed upon the platform, a lost motion connection between said shaft and drum, a spring between said shaft and drum tending to maintain said lost motion connection in engagement, a pawl carrier mounted for movement on said base, a pawl pivoted on said pawl carrier and cooperating with said series of ratchet teeth for locking said drum in weight indicating position, a lever operatively connected to said pawl carrier, and a control member carried by said base and cooperating with said lever for rocking the same in a direction to raise said pawl carrier.

PAUL J. KIRCHER.